Patented June 24, 1930

1,765,869

UNITED STATES PATENT OFFICE

ALPHONS O. JAEGER, OF CHICAGO, ILLINOIS, AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE

PURIFICATION OF GASES

No Drawing.  Application filed August 28, 1925.  Serial No. 53,204.

This invention relates to the purification of gases and more particularly to the purification of gases which are to be used in the catalytic reactions.

Volatile compounds of the metalloids, sulfur, phosphorus, arsenic, antimony, selenium and tellurium, frequently act as catalyst poisons in various vapor phase catalytic reactions. Sulfur compounds are especially harmful in reduction or hydrogenation reactions and are also undesirable in many catalytic oxidations in the vapor phase.

The present invention has for its object the removal of volatile metalloid compounds and particularly volatile sulfur compounds from gases or gaseous mixtures. A further object of the invention is to effect the removal of the undesired metalloid compounds without substantially destroying valuable constituents of the gases and, in some cases, with the recovery of metalloids or metalloid compounds removed in commercially valuable form.

With these objects in view, the invention consists in the treatment of gaseous gases or gaseous mixtures with halogens or compounds yielding halogens with or without the aid of physical agencies such as heat, light, particularly ultraviolet light, silent electric discharge and pressure which aid in the reaction of halogen with metalloid compounds, and chemical catalysts, such as metals, oxides, and salts, and particularly halides of iron, copper, aluminum, antimony, tin, gold, titanium, zirconium, uranium, vanadium, bismuth, molybdenum, zinc, manganese, chromium, nickel, cobalt, silicon, and the like.

Purely surface catalysts, such as coke, wood charcoal, bone charcoal, artificial charcoal, activated carbon, finely divided silicic acid, silicagel, porcelain fragments, fire brick, earthenware fragments, or the like may also be used.

The two types of catalysts may be combined by impregnating the surface catalysts with salts of the metals enumerated above and such combined catalysts are particularly effective as the large surface of the surface catalysts greatly enhance the efficiency of the metal compounds.

It is an advantage of the present invention that substantially all of the volatile metalloid compounds and particularly volatile sulfur compounds, both inorganic and organic, can be transformed into compounds which are readily removed from the gas stream and the whole purification may take place in a single manufacturing operation. The invention, however, is not limited to the removal of all of the metalloid compounds by treatment with halogen, and, on the contrary, particularly where large amounts of hydrogen sulfide are present, part or all of the hydrogen sulfide may be removed by the well known desulfurizing processes, such as treatment with iron oxide and the like, and the remaining gas may then be treated with halogen according to the present invention. Other particular metalloid compounds may be removed before treatment with halogen and this is of advantage in the case of certain gases which contain finely divided metalloid compounds in the form of dust which may be removed by various precipitation and washing methods before treating the gas with halogen. In general, the present invention is applicable to practically all gases containing volatile or gas borne metalloid compounds and the process of this invention may be applied as the only treatment or in combination with other known methods of removing particular compounds.

We have found that the treatment with halogen is effective in transforming volatile metalloid compounds into compounds or products which can readily be removed from the gas stream. In the case of many compounds, and particularly organic compounds of sulfur, the action is largely a halogenating action transforming the compounds into more or less halogenated products which, for the most part, are less volatile than the original compounds. In many cases, however, metalloid compounds, and particularly hydrogen sulfide and similar compounds, are oxidized and, in some cases, the action may be a combined halogenating and oxidizing one. In the case of some metalloid compounds, we are not sure and have been unable to determine precisely what chemical reaction goes on and we do not wish to limit our invention to any particular chemical reaction and, on the contrary, the invention is broadly directed to the removal of volatile or gas formed metalloid compounds from gases by treatment with halogens. We also do not wish to limit our invention to the production of compounds of lower volatility by treatment with halogen since, in some cases, notably in the cases of some sulfur compounds, products may be produced which may be actually more volatile than the original compounds but which may also be more readily soluble in solvents or absorbable in absorbents and can thus be removed from the gas stream. In many cases, a combination of the two effects is noticed and the products of the halogenating treatment may be both higher boiling and more readily absorbed or dissolved. The treatment with halogen may also render some of the metalloid products acid by oxidation and thus permits the removal of the compounds by treatment with bases or basic compounds.

The above described effects are some of those which we have noted in the case of particular metalloid substances when treated by our process but the invention is in no sense limited to any of the reactions mentioned above or to any combination of these reactions which are given merely as probable explanations of some effects of our process and are not intended to limit the invention in any way.

The treatment with halogen may be effected in different ways. Thus, we may use free halogens in the vapor phase or in solution, solutions of halogen yielding substances such as hypochlorites and hypobromites, and similar compounds. We may also use gaseous compounds which yield halogen and which may, at the same time, yield oxygen such as nitrosylchloride, and the like.

Heat, pressure, illumination with ultraviolet light and silent electric discharge may be used alone or in combination with chemical catalysts either simultaneously or progressively or partly simultaneously and partly progressively.

The catalysts may be in the form of solids, mounted on solid masses over which the gases are passed or may be in the form of a rain of finely divided catalysts falling through the gases in the same direction as the gas flow or in counter-current thereto. Catalysts may also be in solution or suspension in liquids and, in some cases, the halogenating agents may be present in the same solution. Gaseous catalysts, such as phosgene, nitrosylchloride, sulfurchloride or bromide, iodine vapors, sulfur dioxide, or trioxide or various combinations of these gases may also be used either as the sole catalysts or in combination with solid catalysts.

When gaseous halogen is used in the presence of gases which tend to react therewith with explosive violence, it is frequently necessary to dilute the halogen with inert gases, such as nitrogen, steam, and the like. We have found that steam is particularly suitable as a diluting agent both on account of its inertness and its relatively high specific heat which tends to prevent local overheating.

In gases containing metalloid compounds which are relatively inactive with halogen, the presence of a gas or gases which are halogenated very readily, may be effective in inducing the reaction between the relatively inactive compounds and halogen, probably due to the large amounts of heat evolved by the reaction of the readily halogenated gases with part of the halogen.

When dissolved halogen or halogen yielding compounds are used, for example, when chlorine or bromine water or solutions of hypochlorites or hypobromites contact between the halogen and the gases to be treated may be rendered more effective by increasing the surface of contact by means of percolating towers or by atomizing the solution into the gas stream. The liquid may be recirculated through the towers or atomizing chambers with suitable enrichments of halogen or halogen compounds to make up for the losses in reactions with gas. Catalysts in solution or in solid suspension may be present in the halogenating liquid and the baffles or tower fillings may advantageously be of catalytically active materials. Heat, increased pressure, or both, are frequently desirable and illumination of the interior of the scrubbing towers with ultraviolet lamps, or silent electric discharge, may be also advantageously used, in order to increase the effectiveness of the halogenating liquid. The various physical accelerating agents may be applied simultaneously or progressively in any desired combination.

Evolution of halogen, in the nascent state, can be effected by treatment of a solution containing halogen compounds with chemicals which set free halogen, for example, oxidation agents. The gases may be passed through the halogen generator, either contacting with the surface of the liquid or bubbling through it or in any other suitable manner, in order to bring the halogen evolved rapidly into contact with a maximum amount of gas. Electrolytic halogen may also be used and the gases permitted to pass over the halogen pole of an electrolytic cell. A particularly advantageous method is to use a perforated hollow electrode as the halogen pole and pass the gases to be treated through the hollow electrode, permitting them to escape through perforations into intimate contact into the halogen evolved. As the evolution of halogen can be accurately controlled by controlling the current through the cell, a very easy and accurate halogenation control can be achieved in this manner.

Other and further variations in the method of halogenating the gases will be apparent to those skilled in the art and are included within the scope of the present invention. The foregoing enumeration of various methods and combinations of methods and the detailed description in specific examples, which will follow below, are to be taken as illustrations of the invention and in no sense do they limit the invention to the particular methods, combination of methods or apparatus therein described.

The halogenated gas can be freed of the metalloid compounds which have been acted on by the halogen, together with the excess halogen and any undesirable gaseous catalysts such as, for example, phosgene, sulfur dioxide, and the like, in various ways. The gases may be scrubbed with various scrubbing liquids such as water, caustic solutions, solutions of carbonates, or organic solvents, such as high boiling oils, products of the distillation of coal tar, petroleum distillates, tetralin, cyclohexane, cyclohexanon, and the like. Combinations of these solvents, either in the form of mixtures or by progressive use of different solvents, may also be employed and are advantageous in some cases.

Pressure, with or without cooling, is also effective and may advantageously be used in many cases to improve the solution or absorption by reducing the partial pressure of the solvent vapors.

The halogenated products may also be removed by absorption or adsorption in various solid bodies of high porosity or capillarity, such as charcoal, coke, bone charcoal, activated carbon, and similar carbonaeous materials. Highly porous silicious materials are also very effective, particularly porous silicic acid, such as silica gel, and they may be used either alone or in combination with the above mentioned carbonaceous materials.

A further method of removing halogenated products consists in freezing them out by lowering the temperature and increasing the pressure to the point where the production precipitates in the form of liquids or solids. This method is particularly advantageous and applicable to large scale operations as it permits the recovery of the halogenated metalloid compounds in the form of by-products which are frequently of considerable commercial importance. For example, halogenated sulfur compounds are useful as vulcanizing agents or as solvents and the value of the recovered metalloids often is more than sufficient to pay for the costs of purifying the gas.

A combination of the above mentioned methods, using them simultaneously or progressively, or partly simultaneously and partly progressively, may be employed and, in many cases, is very desirable. For example, where a relatively high boiling halogenated metalloid compound is formed, which has commercial value, it may be removed by cooling and pressure to the point where the single compound or a limited mixture of compounds precipitate without contamination by the other products which may then be removed by washing in solvents, by absorption, or by a combination of both methods.

A further combined method consists in the use of absorbents such as the various charcoals or carbons or silicious materials, impregnated with halogenation catalysts, so that when the gases are passed over the absorbent, the catalysts bring about halogenation and at the same time the products formed are absorbed, thus performing the two functions at the same time. This method has the advantage that halogenation and absorption take place in a single container or chamber and very high gas speeds with corresponding efficiency may be used. A further advantage lies in the fact that the relatively large masses of absorbents tend to cool the gases which may be strongly heated locally by the halogenation reaction. Overheating is thereby avoided and the life of the catalysts, as well as the efficiency of the process, may be greatly increased. The catalyst impregnated absorbents may also be arranged in zones in order to distribute the reaction over a larger mass and to keep down rises of temperature. A very effective method consists in increasing the strength of the catalyst in the direction of gas flow. Other and different variations may be used and will be apparent to those skilled in the art.

Solvents, which have been saturated with halogenated metalloid products, may be regenerated in various ways, for example, by distillation at atmospheric pressure, or under a vacuum, precipitation by chemicals and other means. Where absorbents are used, they may be regenerated easily by blowing through with air, preferably at an elevated temperature or by washing with solvents for the products absorbed such as, for example, inorganic or organic solvents or sulfur, halogen sulfur compounds, or other metalloid compounds or for carbon tetrachloride or halogen derivatives of various hydrocarbons, both alifatic or aromatic, which may be formed in small amounts when the gases to be purified contain hydrocarbons. Washing solutions may be hot or cold water or dilute alkalies and solutions containing emulsifying agents or detergents may also be employed. Blowing with steam or heating in a vacuum is also effective in many cases. The various methods of regeneration may be used singly or in combination, simultaneously or progressively The products removed during the regeneration in many cases may be recovered and utilized commercially.

The amount of halogen required depends, of course, on the nature of the gas to be purified and on the percentage of metalloid compounds present therein. In general, the addition of about ½% of halogen is usually sufficient except in the cases of gases where an excessive amount of metalloid compounds is present. The invention, however, is not limited to any particular amount of halogen and covers the use of halogen in any suitable amounts for the purpose of removing metalloid compounds from gases.

The size of the halogenating apparatus, absorbers, or washers, depends in large measure on the nature of the gas and the nature of the metalloid compounds present therein. The gas speed is also variable and, in general, should be as fast as can be used consistent with a sufficiently thorough removal of the metalloid compounds so that the purified gas is sufficiently pure for the purposes for which it is intended. In the case of the removal of sulfur compounds, an analysis for sulfur in the gases, before and after passing through the halogenation and absorption apparatus, is the most reliable method of determining whether the process is operating satisfactorily. A similar analysis may also be used in the case of other metalloids to determine the effectiveness of the process.

It should be clearly understood that the present invention is not limited to a complete removal of all of the metalloid compounds present in any particular gas. On the contrary, in many cases, it is sufficient to completely remove some of the metalloid compounds only or to remove all of the metalloid compounds above a certain percentage. The criterion is to be found in the use for which the gas is intended and it is in general unnecessary to purify a gas to a greater degree of purity than is demanded by the uses to which the gas is to be put. The present invention can be used to remove almost quantitatively certain metalloid compounds and to substantially completely remove others but it is equally applicable to gases where a complete removal of some or all of the metalloid compounds is not necessary and in some cases is undesirable.

The invention will be described more particularly in the following specific examples which are illustrations of the application of the principles of the present invention to particular gases using particular modifications of the invention. It should be clearly understood, however, that the invention is not limited to use with the gases enumerated in the specific examples, nor to the particular details of procedure therein set forth, since the examples are merely illustrations of the invention and are in no sense to be considered as limitations.

*Example 1*

Nitrogen contaminated with traces of sulfur compounds such as carbon disulfide and carbonyl sulfide is thoroughly mixed with about ½% of chlorine gas. The mixture is then slowly passed through an apparatus where it is exposed in thin layers to the rays of a mercury vapor lamp. The reacted gases are first passed through a scrubber containing lime water and then through a second scrubber containing tetralin. The gases coming from the last scrubber are cooled to a very low temperature and freed from traces of tetralin vapor which are carried along and finally the cold gases are passed through a tower provided with layers of animal charcoal. The nitrogen so treated is of excellent purity.

*Example 2*

Nitrogen containing hydrogen sulfide and traces of carbon disulfide is compressed 10 atmospheres and passed through a vessel having a chlorine proof lining and provided with trays containing bleaching powder. The effluent gas may advantageously be brought into contact with a chlorine carrier such as aluminum or iron in order to complete the reaction which is frequently not completed in the bleaching powder chamber especially where the gas speed is high. The gas, which is still under a pressure of 10 atmospheres, is washed with a caustic soda solution and is then practically free from sulfur.

*Example 3*

Crude illuminating gas which may contain hydrogen sulfide and organic sulfur compounds is passed through a scrubbing tower where it is brought into contact with chlorine water trickling down through the tower. The chlorine water is constantly circulated and the losses of chlorine are replaced by additional chlorine gases before the water enters the tower. Bromine water can also be used instead of chlorine water. The gases coming from the scrubbing tower are then passed through a tower filled with activated carbon which may be impregnated either partially or wholly with copper phosphate. In large units, the absorption chamber is cooled by copper coils through which cooling water flows. The gases are then passed through washing towers where they are washed first with water and then with caustic soda. The gas, after washing, is practically free from sulfur if the number of purifying units has been suitably chosen in connection with the amount of sulfur impurities in the gas.

The activated carbon becomes charged with reaction compounds and can be regenerated by blowing through steam which removes the halogenated products absorbed in the carbon and these products may be recovered. In the case of ordinary crude illuminating gas, chlorine-sulfur compounds are formed and in some cases also chlorine derivatives of methane, ethylene and benzol. The chlorine products recovered may be commercially utilized.

Example 4

Carbon dioxide containing carbonyl sulfide is mixed with a small amount of gaseous chlorine and passed through a tower filled with activated carbon. The carbon may advantageously be partly or wholly impregnated with iron chloride or manganese chloride which act as carriers. The gas is then washed with a solution of sodium bicarbonate yielding a final product of high purity.

Example 5

Carbon dioxide containing carbonyl sulfide is mixed with a small amount of chlorine gas and passed through a tower filled with activated carbon. The carbon may largely be partly or wholly impregnated with iron chloride or manganese chloride which act as carriers. A mercury vapor lamp is arranged so as to illuminate the interior of the tower. The gas after chlorination is washed with a solution of sodium bicarbonate and yields a final product of high purity suitable for use in catalytic reductions.

Example 6

A mixture of hydrogen and nitrogen containing small amounts of organic sulfur compounds is treated with chlorine water which carries dissolved copper chloride or suspended manganese oxide in order to increase its effectiveness. The gas may also be washed with a diluted solution of a hypochlorite. The treatment with chlorine water or hypochlorite solution may advantageously take place in a washing tower where the solutions trickle over a substantially inert filling in order to expose a greater surface to the gas. After passing through the chlorinating tower, the gas is introduced into towers containing absorbent carbon and is finally washed with a caustic soda solution. Then the gas is practically free from sulfur.

Example 7

Crude commercial water gas which contains, among others, hydrogen sulfide and organic sulfur compounds, as impurities, is passed through a percolating tower lined with acid-resistant stone or quartz plates and filled with flint or other siliceous pebbles. Chlorine water containing copper chloride is used in the tower and is continuously recirculated, the chlorine lost being made up by the addition of fresh chlorine to the water before it enters the tower. The water gas then passes through a solution containing water followed by washing with an alkaline solution. The gas is then compressed to 200 atmospheres and water removed in a suitable tower whereupon the gas, still under high pressure, is passed through the two absorption towers lined with copper and provided with layers of a filling prepared as follows:

100 parts of water glass (40° Bé.) are diluted with 1000 parts of water, and 150 parts of carbonized sugar are stirred in and an ammoniacal copper carbonate solution containing 5 parts of copper added.

Hydrochloric acid is then added gradually with vigorous agitation until the mixture reacts neutral litmus and the whole solidifies in the form of a gel. The gel is pressed and the precipitate repeatedly washed at room temperature, the washing being kept up until water soluble salts are no longer noted in the filtrate. The doughy substance is dried and formed into granules with dextrin at a somewhat elevated temperature and is then activated by heating to 400–500° C. in a stream of ammonia followed by blowing with nitrogen.

After passing through the towers containing the above described absorbent, the water gas is washed with a caustic soda solution and is then practically free from sulfur.

Example 8

Coal gas containing 4.5% $CO_2$, 38% CO, 54.5% $H_2$, 1% $CH_4$ and 2% $N_2$ and also containing about 250 grs. of sulfur per 100 cbm., the sulfur being in the form of inorganic or organic sulfur compounds is treated in a percolating tower with chlorine water and then washed with a sodium bicarbonate solution. The washed gas is then passed into a tower filled with charcoal which may be partly or wholly impregnated with aluminum phosphate. Thereupon, the gas is passed through a second tower filled with absorbent carbon produced by charring substances rich in humus.

The gas is then heated in a heat exchanger, mixed with steam in excess, and passed through a catalytic chamber at 500° C., the chamber being filled with iron oxide contact masses. The carbon monoxide and steam is converted into carbon dioxide and hydrogen in the known way. The gas is then cooled and washed with water under pressure to remove carbon dioxide and after releasing the pressure, the washed gas is again treated in acid-resistant percolating towers which are free from iron by means of a hypochlorite solution which reacts with the last traces of sulfur compounds. To remove the transformation products, the gas is first washed with water and then passed through an absorption tower filled in the manner similar to that described in Example 7. A further wash with ammoniacal copper oxide solution follows and hydrogen produced is of high purity and excellently suited for catalytic purposes.

The transformation products of the sulfur compounds together with the gas constituents which have been halogenated can be recovered by regenerating the absorbent and the products commercially utilized.

Example 9

Hydrogen, produced by the reaction of commercial zinc and commercial hydrochloric acid, and which contains considerable amounts of arsenic compounds, is passed through chlorine or bromine water and is first washed with cold water and then with caustic soda solution. The hydrogen so purified is practically free from arsenic. The arsenic compound may be recovered by the wash liquors.

It will be seen that the present invention constitutes a simple and effective method of purifying gases which contain metalloids or metalloid compounds and is applicable to a wide range of gases, such as those produced by the distillation of coal or carbonaceous materials, such as wood, gas from coke, gases resulting from the cracking of hydrocarbons under pressure, various types of water gases, and gases produced by chemical reactions. The process may also be applied to gases indirectly produced from coal, as by the Messerschmidt process, and to the gasses produced by the Linde process from air or by various electrolytic processes.

A further important field consists in various natural gases and tail gases from the distillation of petroleum and other similar materials. Exhaust gases which have been subjected to chemical treatment and have become contaminated during the treatment may also be treated by the present process.

In the claims, the word "substance" is used to cover chemical elements, their oxides, salts, both simple and complex, and other compounds, and the word "compound" is limited to the combination of at least two chemical elements into a single chemical individual.

The expression "active halogen" as used in the claims is intended to be limited to chlorine and bromine and excluded iodin which is not active in most of the purification processes of the present invention.

We claim:

1. A method of purifying gases containing metalloid substances and hydrogen or hydrocarbon gases which comprises treating the gases with active halogen in the presence of a halogen carrier and removing the reaction products of active halogen and the metalloid substances to a substantial extent.

2. The method of purifying gases containing sulfur substances and hydrogen or hydrocarbon gases which comprises treating the gases with gaseous chlorine, removing the reaction products of the chlorine and sulfur substances to a substantial extent.

3. The method of purifying gases containing metalloid substances which comprises treating the gases with halogen and removing at least part of the reaction products of halogen and the metalloid substances by chilling the treated gases.

4. A method of purifying gases containing metalloid substances which comprises treating the gases with active halogen and removing part at least of the reaction products of the halogen and metalloid substances by means of a high boiling organic solvent.

5. The method of purifying gases containing sulfur substances which comprises treating the gases with halogen and removing at least part of the reaction products of halogen and the sulfur substances by means of tetralin.

6. The method of purifying gases containing metalloid substances which comprises treating the gases with halogen and removing at least part of the reaction products of halogen and the metalloid substances by means of solvents followed by chilling.

7. The method of purifying gases containing metalloid substances and hydrogen or hydrocarbon gases which comprises treating the gases with halogen and removing at least part of the reaction products of halogen and the metalloid substances by means of solvents followed by treatment with solid absorbents.

8. The method of purifying gases containing metalloid substances and hydrogen or hydrocarbon gases which comprises treating the gases with halogen in the presence of a combined halogen carrier and a solid absorbent.

9. The method of purifying gases containing sulfur substances and hydrogen or hydrocarbon gases which comprises treating the gases with halogen in the presence of a combined halogen carrier and solid absorbent.

10. The method of purifying gases containing metalloid substances which comprises treating the gases with halogen in the presence of a combined halogen carrier and solid absorbent followed by treatment with a solvent for the reaction products of halogen with the metalloid substances.

11. The method of purifying gases containing sulfur substances which comprises treating the gases with halogen in the presence of a combined halogen carrier and solid absorbent followed by treatment with a solvent for the reaction products of halogen with the sulfur substances.

12. A method of purifying gases containing mixtures of hydrogen, carbon monoxide and sulfur substances which comprises treating the gases with small amounts of gaseous active halogen and removing the reaction products of the halogen and the sulfur substances to a substantial extent.

13. A method of purifying gases containing metalloid substances which comprises treating the gases with active chlorine and removing part at least of the reaction products of the chlorine and metalloid substances by means of a high boiling organic solvent.

Signed at St. Louis, Missouri, this 24th day of August, 1925.

ALPHONS O. JAEGER.
JOHANN A. BERTSCH.